US009216912B2

(12) United States Patent
Tarascon et al.

(10) Patent No.: US 9,216,912 B2
(45) Date of Patent: Dec. 22, 2015

(54) METHOD FOR PREPARING ALKALI METAL AND TRANSITION METAL FLUOROSULFATES

(75) Inventors: Jean-Marie Tarascon, Mennecy (FR); Mohamed Ati, Amiens (FR); Michel Armand, Paris (FR); Nadir Recham, Amiens (FR)

(73) Assignee: Centre National de la Recherche Scientifque, Paris (FR)

( * ) Notice: Subject to any disclaimer, the term of this patent is extended or adjusted under 35 U.S.C. 154(b) by 490 days.

(21) Appl. No.: 13/697,573

(22) PCT Filed: May 11, 2011

(86) PCT No.: PCT/FR2011/051051
§ 371 (c)(1),
(2), (4) Date: Jun. 21, 2013

(87) PCT Pub. No.: WO2011/144838
PCT Pub. Date: Nov. 24, 2011

(65) Prior Publication Data
US 2014/0291572 A1    Oct. 2, 2014

(30) Foreign Application Priority Data

May 17, 2010    (FR) ..................................... 10 53788

(51) Int. Cl.
*C01D 15/06*    (2006.01)
*C01G 49/00*    (2006.01)
(Continued)

(52) U.S. Cl.
CPC ....... *C01D 15/06* (2013.01); *C01D 5/00* (2013.01); *C01G 49/009* (2013.01); *C01G 49/14* (2013.01); *C01G 51/006* (2013.01); *C01G 51/10* (2013.01); *C01G 53/006* (2013.01); *C01G 53/10* (2013.01); *H01M 4/5825* (2013.01); *C01P 2002/54* (2013.01); *C01P 2002/72* (2013.01);
(Continued)

(58) Field of Classification Search
CPC ....... C01D 15/06; C01D 5/00; H01M 4/5825; C01G 51/10; C01G 49/009; C01G 53/006; C01G 49/14; C01G 53/10; C01G 51/006; C01P 2006/40; C01P 2004/03; C01P 2002/72; C01P 2002/85; C01P 2002/88; C01P 2002/54
See application file for complete search history.

(56) References Cited

U.S. PATENT DOCUMENTS

2004/0197654 A1* 10/2004 Barker et al. ............... 429/218.1
2005/0163699 A1    7/2005 Barker et al.

OTHER PUBLICATIONS

International Search Report dated Jul. 22, 2011.
(Continued)

*Primary Examiner* — Peter F Godenschwager
*Assistant Examiner* — Andrew J Oyer
(74) *Attorney, Agent, or Firm* — Sofer & Haroun, LLP

(57) ABSTRACT

The invention relates to a method for preparing an alkali metal and transition metal fluorosulfate that is useful as an electrode material in an electrochemical battery that operates by alkali ion exchange. The method includes a first step that involves: preparing a mixture of precursors of elements making up fluorosulfate, placing said mixture in contact with a solid polymer at ambient temperature, subjecting the reaction medium to a heat treatment that aims to melt the polymer, and subsequently reacting the precursors with one another. Said polymer is one that is solid at ambient temperature, has a melting point lower than the reaction temperature of the precursors, is stable at least up to the reaction temperature of the precursors, and is soluble in a nonpolar aprotic organic solvent.

14 Claims, 10 Drawing Sheets

(51) Int. Cl.
  *C01G 49/14* (2006.01)
  *C01G 51/00* (2006.01)
  *C01G 51/10* (2006.01)
  *C01G 53/00* (2006.01)
  *C01G 53/10* (2006.01)
  *H01M 4/58* (2010.01)
  *C01D 5/00* (2006.01)

(52) U.S. Cl.
  CPC ......... *C01P2002/85* (2013.01); *C01P 2002/88* (2013.01); *C01P 2004/03* (2013.01); *C01P 2006/40* (2013.01)

(56) References Cited

OTHER PUBLICATIONS

Fluorosufate Positive Electrode Materials Made with Polymers as Reacting Media.

Synthesis. crystal structure and lithium ion conductivity of L i MgFS04.

A 3.6 V lithium-based fluorosulphate insertion positive electrode for lithium-ion batteries.

* cited by examiner a                                    b

METHOD FOR PREPARING ALKALI METAL AND TRANSITION METAL FLUOROSULFATES

RELATED APPLICATIONS

This application is a National Phase Application of PCT/FR2011/051051, filed on May 11, 2011, which in turn claims the benefit of priority from French Patent Application No. 10 53788 filed on May 17, 2010, the entirety of which are incorporated herein by reference.

BACKGROUND

1. Field of the Invention

The present invention relates to a method for preparing a fluorinated material usable as electrode active material, as well as the material obtained.

2. Technological Background

Lithium batteries using a lithium ion insertion compound as the basis for operation of the positive electrode are known.

Among the known insertion compounds, we may notably mention the lithium transition-metal oxides, for example $Li_x\text{-}CoO_2$, $0.4 \leq x \leq 1$ which is used in pure form or in solid solution with nickel, manganese and aluminum. The main obstacles to general application of this type of electrochemistry are the scarceness of cobalt and the excessively positive potential of the transition metal oxides, with consequent safety problems for the battery.

We may also mention the compounds $Li_x T^M{}_{M'} XO_4$ in which $T^M$ represents at least one metal selected from Fe, Mn and Co, optionally replaced partially with one or more elements that have a valency between 1 and 5. These compounds only exchange lithium, and only have a very low electronic and ionic conductivity. These handicaps can be overcome by using very fine particles (such as nanoparticles) and by depositing a carbon coating by pyrolysis of organic compounds. The drawbacks associated with the use of nanoparticles are poor compactness, which is reflected in a loss of specific energy, and this problem is made worse by the deposition of carbon. Moreover, carbon deposition is carried out at high temperature, in reducing conditions. In practice, it is difficult to use elements with an oxidation state above 2, as they are reduced. This applies to $Fe^{III}$, $Mn^{III}$, $Cr^{III}$, $Vu^{III}$, $V^{IV}$, which are useful dopants for increasing the ionic or electronic conductivity. Other compounds have been proposed, notably compounds corresponding to the general formula $A_a M_b (SO_4)_c Z_d$, in which A represents at least one alkali metal, Z represents at least one element selected from F and OH, and M represents at least one divalent or trivalent metal cation. These compounds comprise in particular the fluorosulfates. L. Sebastian, et al. [J. Mater. Chem. 2002, 374-377] describe the preparation of $LiMgSO_4F$ by the ceramic route. Moreover, US-2005/0163699 describes the preparation, by the ceramic route, of fluorosulfate compounds of lithium and of M in which M is Ni, Fe, Co, Mn, (MnMg), (FeZn), or (FeCo). These compounds are prepared by the ceramic route starting from the Li precursor LiF and the sulfate of the element or elements M. Among these compounds, the most interesting are those that contain Fe, because besides their relatively low cost, they are likely, on the basis of structural and chemical considerations (notably the ionocovalency of the bonds) to display interesting electrochemical properties in a desirable potential range for guaranteeing reliable use for high-volume applications. For reasons of inductive effect, the sulfates generally have higher potentials than the phosphates, whatever their structure. Examples of preparation of compounds containing various metallic elements are described in the aforementioned US-2005/0163699. Thus, example 2 describes the preparation of a compound $LiFeSO_4F$ by a ceramic method at 600° C. that gives an inhomogeneous compound, then at 500° C. with production of a reddish black compound, or at 400° C. in air with production of a red compound. This method can permit the reduction of the $SO_4^{2-}$ group by $Fe^{2+}$ in the absence of oxygen according to $SO_4^{2-} + 2Fe^{2+} \Rightarrow SO_2 + O^{2-} + 2Fe^{3+}$. The red color found in the compounds obtained at the different temperatures is due to the $O^{2+}/Fe^{3+}$ association in a crystal lattice for example in the form of the oxide $Fe_2O_3$. It is known, moreover, that the compounds of $Fe^{II}$ oxidize in air starting from 200° C., giving $Fe^{III}$, and the preparation of example 2 at 400° C. in air confirms this. The iron-containing compounds that are prepared by the ceramic route from LiF and iron sulfate according to US-2005/0163699 therefore do not consist of $LiFeSO_4F$. Moreover, it appears that compounds in which M is Co or Ni are not stable at the temperatures employed during the recommended preparation by the ceramic route. Therefore it is not plausible that the compounds described in US-2005/0163699 had really been obtained.

The methods of preparation of alkali metal and transition metal fluorosulfate compounds by the ceramic route are generally inexpensive, but they have very slow kinetics.

FR-2 937 970 describes the preparation of lithium and transition metal sulfates, from hydrated transition metal sulfate and lithium fluoride, using a hydrophobic ionic liquid as the reaction substrate. Methods in which the precursors of the fluorosulfate are in solution or in suspension in an ionic liquid medium have faster kinetics, and they make it possible to control the crystallographic structure of the compounds obtained, as said ionic liquid has the effect of encapsulating the hydrated sulfate molecule used as precursor of the sulfate anion and of Fe. However, the use of an ionic liquid makes the method expensive because of the cost of the ionic liquids, and rather impractical because the substrate is liquid.

THE PRESENT INVENTION

The aim of the present invention is to provide a method that makes it possible to produce, reliably, quickly and economically, an alkali metal and transition metal fluorosulfate, particularly useful as electrode material in an electrochemical battery operating by exchange of alkaline ions.

GENERAL DEFINITION OF THE INVENTION

The method of the present invention is intended to produce a material consisting of particles of a compound that has a structure of the tavorite type and corresponds to the formula $(A_{1-a}A'_a)_x(Z_{1-b}Z'_b)_z(SO_4)_s F_f$ (I) in which: A represents Li or Na; A' represents a vacancy or at least one doping element; Z represents at least one 3d element selected from Fe, Co, and Ni; Z' represents a vacancy or at least one doping element; the subscripts a, b, x, z, s and f are selected so as to ensure electroneutrality of the compound, and $a \geq 0$, $b \geq 0$, $x \geq 0$, $z > 0$, $s > 0$, $f > 0$); and the respective amounts a and b of dopant A and Z' are such that the structure of the tavorite type is preserved. The method comprises:

- a 1st step consisting of preparing a mixture of precursors containing a hydrated sulfate, of the element or elements Z, the fluoride of the element or elements A, a precursor of the element or elements Z' when a>0 and a precursor of the element or elements A' when b>0;
- a 2nd step consisting of contacting the mixture obtained in the 1st step with a solid substrate;

a 3rd step consisting of bringing the mixture obtained at the end of the 2nd step to the reaction temperature of the precursors mixed during the 1st step, and maintaining said temperature until the end of the reaction;

a 4th step consisting of removing the solid substrate;

said method being characterized in that the solid substrate is a polymer that is solid at room temperature, has a melting point below the reaction temperature of the precursors and is stable at least up to the reaction temperature of the precursors, said polymer being soluble in a nonpolar aprotic organic solvent.

DETAILED DESCRIPTION

The substrate polymer of the reaction is preferably selected from the polymers that are stable at the reaction temperature for a sufficient time to permit the complete reaction which gives a single phase. The solvent can be selected from the nitriles (for example acetonitrile), the ketones (for example acetone), a chloroalkane having from 1 to 6 carbon atoms (for example dichloromethane), alcohols having from 1 to 3 carbon atoms, ethyl acetate and THF.

The polymer can notably be a polyethylene glycol (PEG), polyoxyethylene (PEO), a polystyrene (PS) or a poly(methyl methacrylate) PMMA. For each particular case of preparation, the polymer is selected depending on its range of stability, its viscosity and its melting point (which depend on its molecular weight). For similar performance, a PEG can be used having a lower molecular weight than a PEO.

When the reaction substrate polymer is a polyethylene glycol (PEG), it can be selected from the PEGs that have only OH end groups, the polyethylene glycol dialkyl ethers (PEGDAE) and the polyethylene glycol monoalkyl ethers (PEGMAE). A PEGDAE of high molecular weight is more stable than a PEGDAE of lower molecular weight, and a PEGDAE is more stable than a polyethylene glycol monoalkyl ether (PEGMAE) of equivalent molecular weight. For example, a polyethylene glycol dimethyl ether (PEGDME) of molecular weight 2000 is stable at 295° C. for at least 24 hours, in contrast to a PEGDME having a molecular weight of 800, a polyethylene glycol monomethyl ether (PEGMME) of molecular weight 1000 or a polyethylene glycol having acid end groups and a molecular weight of 600.

When the substrate polymer is a polyether, it can be selected from the poly(ethylene oxide)s (PEO) or the copolymers of ethylene oxide and a comonomer, for example propylene oxide. A block copolymer of ethylene oxide and propylene oxide having a molecular weight of 5800 and two OH end groups has sufficient thermal stability to permit complete reaction between the precursors and production of a single-phase product. Conversely, a polymer of the same nature having a molecular weight of 1400 a.u. and a single OH end group does not have sufficient stability.

The temperatures at which the precursors used react are known by a person skilled in the art. They are generally below 300° C. and a reaction time of 24 hours is generally sufficient to obtain a single phase. For example:

LiF and $FeSO_4.H_2O$ react at a temperature equal to at least 230° C. At 295° C., a reaction time of 24 h is sufficient to obtain a single phase $LiFeSO_4F$;

NaF and $FeSO_4.H_2O$ react at a temperature equal to at least 230° C. At 290° C., a reaction time of 24 h is sufficient to obtain a single phase $NaFeSO_4F$;

LiF and $CoSO_4.H_2O$ react at a temperature equal to at least 230° C. At 270° C., a reaction time of 24 h is sufficient to obtain a single phase $LiCoSO_4F$;

LiF and $NiSO_4.H_2O$ react at a temperature equal to at least 230° C. At 270° C., a reaction time of 24 h is sufficient to obtain a single phase $LiNiSO_4F$;

NaF and $CoSO_4.H_2O$ react at a temperature equal to at least 250° C. At 290° C., a reaction time of 24 h is sufficient to obtain a single phase $NaCoSO_4F$.

The fluorosulfates (I) obtained by the method of the invention have a tavorite structure. The tavorite structure comprises $MO_4F_2$ octahedra centered on the transition metal M (M=Fe, Co, Ni, Mn, Mg etc.) and joined together by apical fluorine atoms forming chains along the c axis. The octahedra all have F atoms in the trans position, but they are distributed in two different types. The chains are joined together by isolated $SO_4$ tetrahedra, thus creating a three-dimensional structure and delimiting tunnels along the [100], [010] and [101] axis.

A compound (I) according to the present invention has a tavorite structure that is distorted because the element $A_{1-a}A'_a$ is lodged in said tunnels (3D diffusion). When A is Li, the structure of the distorted tavorite type of compound (I) has a triclinic cell crystallizing in the P-1 space group. When A is Na, the structure of the distorted tavorite type of compound (I) has a monoclinic cell crystallizing in the $P2_1/C$ space group.

When A' is a doping element, A' can be an alkali metal different from A, an alkaline-earth metal or a 3d metal, in particular Ti, V, Cr, Mn, Fe, Mn, Co or Cu. In general, the content "a" of dopant A' is preferably less than 0.25%, i.e. a<0.25.

When Z' is a doping element, Z' can be a metal selected from the alkali metals, Mn, Mg, Ca, Sc, Ti, V, Cr, Zn, Al, Ga, Sn, Zr, Nb and Ta in at least one of their oxidation states. In general, the content "b" of dopant Z' is preferably less than 25%, i.e. b<0.25. The dopants Z' that are particularly useful are Mn, Mg, Zn, Ti, and Al.

Compounds according to the invention that are particularly preferred are those that correspond to the formulas $Li(Z_{1-b}Z'_b)SO_4F$ and $Na(Z_{1-b}Z'_b)_zSO_4F$, in particular $LiFeSO_4F$, $LiCoSO_4F$, $LiNiSO_4F$ and their solid solutions, $NaFeSO_4F$, $NaCoSO_4F$, $NaNiSO_4F$ and their solid solutions, as well as the solid solutions $Li(Z_{1-b}Mn_b)SO_4F$ and $Na(Z_{1-b}Mn_b)SO_4F$ in which Z is Fe, Co or Ni, b≤0.2.

A particular category of compounds (I) comprises the compounds in which the group $(Z_{1-b}Z'_b)$ represents more than one element. They are compounds in which Z represents more than one element selected from Fe, Co and Ni, as well as compounds in which b≠0, and the two cases can be combined.

A compound according to the invention is in the form of particles smaller than 100 μm, or even smaller than 100 nm.

In the 1st step of the method, the precursors are used in stoichiometric amount, or with an excess of fluoride of alkali metal A, preferably less than 10%.

The amount of precursors in the mixture obtained at the end of the 2nd step is preferably from 10 to 50 wt %, and more preferably from 15 to 25 wt %, relative to the total weight "precursors+polymer substrate".

The precursor of alkali metal A is a fluoride of A, LiF or NaF in this case. It also acts as precursor of F.

When compound (I) contains A', the elements A' are introduced in the form of a compound whose anion is F or $SO_4^{2-}$ or in the form of a compound whose anion is easy to remove, by selective dissolution, for example in the form of a halide other than F.

A precursor of A' or of Z' selected from the fluorides can also act as an additional precursor of F. Moreover, an additional precursor of F can be selected from the fluorides whose cation is easy to remove, such as ammonium, imidazolium or pyridinium fluorides (for example $NH_4F$, nHF or $C_3HsN_2F$, nHF, or $C_5H_6NF$, nHF, n being less than or equal to 5).

The precursor of Z is a hydrated sulfate of Z. The use of a monohydrate sulfate is particularly favorable for obtaining a compound (I) in the form of a single phase with distorted tavorite structure. The monohydrate $ZSO_4.H_2O$ can be obtained from $ZSO_4.7H_2O$ either by heating under vacuum at a temperature between 150° C. and 450° C. (for example 200° C.), or by heating in a heating of $FeSO_4.7H_2O$ introduced in a polyethylene glycol (PEG) at a temperature between 200 and 240° C. for 2 hours makes it possible to obtain, after removing the PEG and drying, the compound $FeSO_4.H_2O$ in the form of a powder with color varying from greenish white [when the product obtained contains a small amount of $FeSO_4.4H_2O$ (1 to 5%)] to greyish white [when the product obtained contains a tiny amount of anhydrous $FeSO_4$ (1%)]. The molecular weight of the PEG used can vary widely, for example between 500 and 20000 a.u. (g/mol).

The precursor of an element Z' is preferably a sulfate (in which case it supplies the required complement of sulfate anion). It can moreover be a fluoride of Z' (in which case it also acts as a precursor of F) or a compound whose anion is easy to remove so as not to contaminate the final compound (I) (for example a halide other than a fluoride).

In a preferred embodiment, the precursor of the element or elements Z and Z' is in the form of a solid solution in hydrated form, in particular in the form of a monohydrate. A precursor $Z_{1-b}Z'_bSO_4.H_2O$ can be prepared notably by a method comprising the following steps:
- dissolving 1-b mol of $ZSO_4.7H_2O$ and b mol of $Z'SO_4.7H_2O$ in water previously degassed with argon or nitrogen to prevent oxidation of Fe(II), b preferably being less than 0.3;
- adding an alcohol (for example ethanol or isopropanol) to cause precipitation of $Z_{1-b}Z'_bSO_4.7H_2O$;
- recovering (for example by centrifugation) the powder that has formed,
- washing with alcohol, then heating at a temperature between 150 and 250° C. (for example at 200° C.) under vacuum for 1 hour.

A precursor in which Z represents Fe and Co or Fe and Ni can be prepared in the same way from $FeSO_4.7H_2O$ and $CoSO_4.7H_2O$ or from $FeSO_4.7H_2O$ and $NiSO_4.7H_2O$, b being less than 1.

The compounds $Z_{1-b}Z'_bSO_4.H_2O$ can, moreover, be obtained from $Z_{1-b}Z'_bSO_4.7H_2O$ by a method similar to that described above for obtaining a compound $ZSO_4.H_2O$ from a compound $ZSO_4.7H_2O$.

The precursor of element Z which is necessarily a sulfate, consequently also acts as a precursor of the sulfate anion. An additional sulfate precursor can be selected from the sulfates of the elements Z' and/or A', as well as from the sulfates of cations that are easy to remove, notably the acid $H_2SO_4$, and its thermally labile ammonium, amine, imidazole or pyridine salts, for example $NH_4HSO_4$, $(NH_4)_2SO_4$, $(C_3HsN_2)HSO_4$, $(CsH_6N)_2SO_4$, $(C_3H_5N_2)_2SO_4$ and $(C_5H_6N)HSO_4$.

In a particular embodiment, the third step comprises two successive phases. The first phase aims to melt the reaction substrate polymer, said polymer being selected so that its melting point is below the temperature at which the precursors of compound (I) react to with one another. The temperature of this 1st phase is generally between 30 and 160° C. The second phase aims to react the precursors of compound (I). It is generally carried out at a temperature between 230 and 300° C.

The 3rd step is preferably carried out under an inert atmosphere, at atmospheric pressure.

The heating can be carried out by various means, notably by heating in a furnace, or by microwave heating. It can be carried out continuously, in a heated enclosure in which the reaction mixture comprising the liquid substrate polymer and the precursors circulate, with a residence time that allows the reaction to go to completion.

The heating time generally varies from 10 minutes to 200 hours, preferably from 3 to 30 hours.

The separation of compound (I) during the 4th step can be performed for example by extraction of the substrate polymer with a nonpolar aprotic organic solvent in which the polymer is soluble, and removal of any byproducts.

After separation, compound (I) can be washed with a polar aprotic organic solvent of the same type (such as acetone, acetonitrile, ethyl acetate for example), and then used without additional purification.

A compound (I) can be used in various applications depending on the elements of which it is constituted. As an example, compounds (I) of the invention can be used as active material for the manufacture of electrodes in batteries and electrochromic systems, as ceramics, as magnetic materials for data storage, as pigment, or in a photovoltaic cell as light absorbing material with a better result than that obtained by means of $TiO_2$ used conventionally.

When a compound according to the invention is used as an electrode material, the electrode can be prepared by depositing, on a current collector, a composite material obtained by mixing, by manual grinding or by mechanical grinding (for example by grinding for about 10 minutes using a type SPEX 1800 grinding mill), a mixture comprising a compound of the invention and an electronic conduction agent (for example a carbon black). The percentage by weight of compound (I) relative to the composite material "compound (I)+carbon" can be from 50 to 99%, more particularly from 80 to 95%.

The amount of material deposited on the current collector is preferably such that the amount of compound according to the invention is between 0.1 and 200, preferably from 1 to 50 mg per $cm^2$. The current collector can consist of a grid or a sheet of aluminum, of titanium, of graphite paper or of stainless steel.

An electrode according to the invention can be used in an electrochemical cell comprising a positive electrode and a negative electrode separated by an electrolyte. The electrode according to the invention constitutes the positive electrode.

The negative electrode can consist of metallic lithium or an alloy thereof, a transition metal oxide formed by reduction of a nanometric dispersion in lithium oxide, or a double nitride of lithium and a transition metal. The negative electrode can, moreover, consist of a material capable of reversible insertion of $Li^+$ ions at potentials below 1.6 V. As examples of such materials, we may mention the oxides with low potential having the general formula $Li_{1+y+x/3}Ti_{2-x/3}O_4$ ($0 \le x \le 1$, $0 \le y \le 1$), $Li_{4+x'}Ti_5O_{12}$ ($0 \le x' \le 3$), carbon and carbon-containing products resulting from the pyrolysis of organic materials, as well as dicarboxylates.

The electrolyte advantageously comprises at least one lithium or sodium salt in solution in a polar aprotic liquid solvent, in a solvating polymer optionally plasticized by a liquid solvent or an ionic liquid, or in a gel consisting of a liquid solvent gelled by adding a solvating or nonsolvating polymer.

DETAILED DESCRIPTION

Examples

The present invention is illustrated by the following examples, but is not limited to these.

The following products were used:

$FeSO_4 \cdot 7H_2O$, supplied by the company Fisher Scientific $CoSO_4 \cdot 7H_2O$, supplied by the company Acros Organic $NiSO_4 \cdot 7H_2O$, supplied by the company Acros Organic Polyethylene glycol of molecular weight 20 000 a.u. (PEG 20 000) supplied by the company Alfa Aesar (melting point $T_M=62.4°$ C., decomposition temperature $T_D=351°$ C.);

PEG monomethyl ether of molecular weight 1000 a.u. supplied by the company Alfa Aesar ($T_M=52-56°$ C., $T_D>300°$ C.);

PEG monomethyl ether of molecular weight 2000 a.u. supplied by the company Alfa Aesar ($T_M=52-56°$ C., $T_D>300°$ C.);

PEG dimethyl ether of molecular weight 2000 a.u. supplied by the company Alfa Aesar ($T_M=49-53°$ C., $T_D>300°$ C.);

Polyethylene glycol of molecular weight 8000 a.u. (PEG 8000) supplied by the company Alfa Aesar ($T_M=62.4°$ C., $T_D=256°$ C.);

Poly(ethylene oxide) of molecular weight >5 000 000 a.u. (PEO>5 000 000) supplied by Alfa Aesar ($T_M=62.4°$ C., $T_D=326°$ C.);

Polymethyl methacrylate of molecular weight 38 000 a.u. (PMMA 38 000), supplied by Acros Organic ($T_M=120°$ C., $T_D=303°$ C.)

Polystyrene of molecular weight 25 000 a.u. supplied by Alfa Aesar ($T_M=150°$ C., $T_D>400°$ C.);

PEG 600 diacid, having a molecular weight of 600 a.u., marketed by Aldrich ($T_M$=room temperature, $T_D=>280°$ C.)

PEG-PPO-PEG copolymer, molecular weight $M_w=5800$ a.u., $T_M=60°$ C., $T_D>300°$ C., marketed by the company Aldrich Sigma under the name Pluronic PE10300) and corresponding to the formula

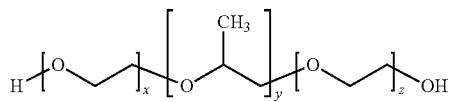

PE-block-PEG copolymer, molecular weight $M_w=1400$ a.u., $T_M=60°$ C., $T_D=260°$ C., corresponding to the formula

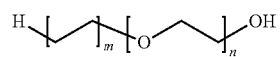

X-ray diffraction analyses were performed using a Bruker D8-Advantage powder diffractometer with Cu-Kα radiation ($\lambda_1=1.5405$ Å, $\lambda_2=1.5443$ Å).

Figure 1:
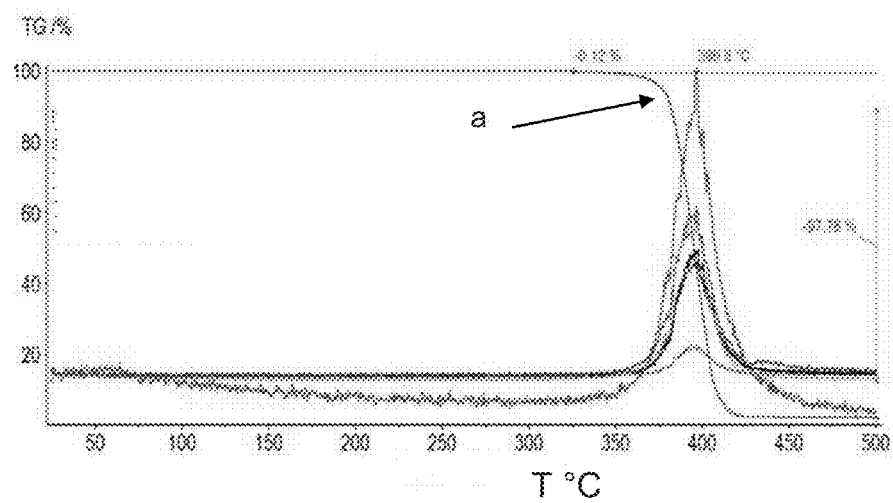
FIG. 1 is a melting point/thermal stability chart for PEG 20 000 in accordance with one embodiment.
Figure 2:
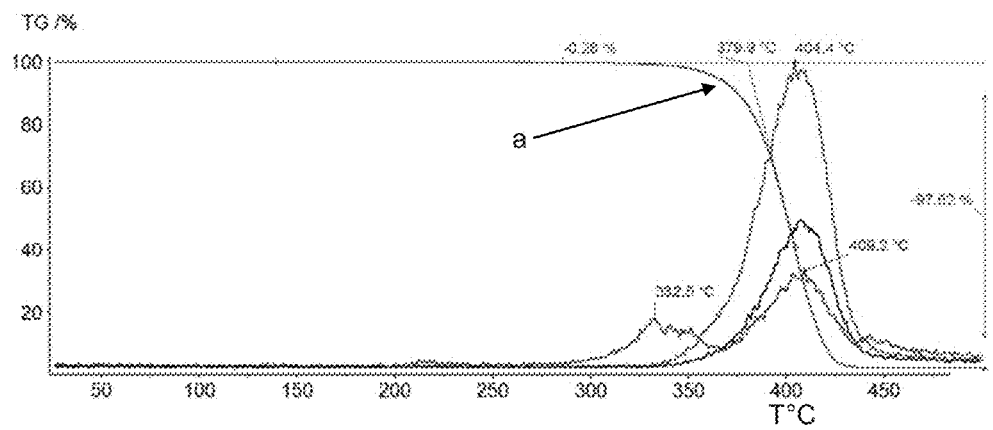
FIG. 2 is a melting point/thermal stability chart for PEO>5 000 000 in accordance with one embodiment.
Figure 3:
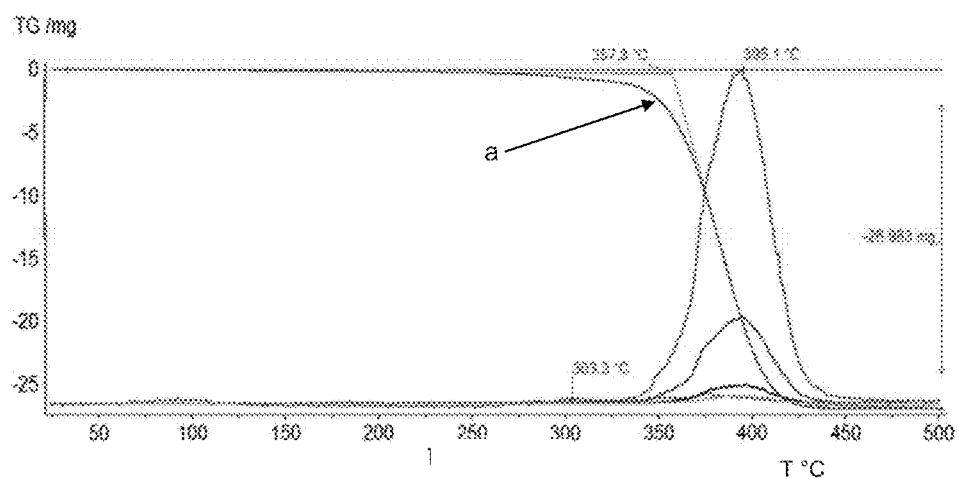
FIG. 3 is a melting point/thermal stability chart for PMMA 38 000 in accordance with one embodiment.

The stability of certain polymers used as reaction substrates was verified by thermogravimetric analysis, using the STA 449C Jupiter Thermal Analyzer marketed by the company Netzsch. The measurements were performed under argon with a temperature ramp of 5° C./min up to 500° C. The diagrams are shown in FIGS. 1 to 3. In each of these figures, the curve denoted by "a" shows the variation of the molecular weight of the polymer as a function of temperature.

FIG. 1 corresponds to the polymer PEG 20 000 and it shows that this polymer, which has a melting point of 62.4° C., is thermally stable up to 350° C.

FIG. 2 corresponds to the polymer PEO>5 000 000, and it shows that this polymer, which has a melting point of 64.1° C., is thermally stable up to 326° C.

FIG. 3 corresponds to the polymer PMMA 38 000, and it shows that the thermal stability of this polymer is less than that of PEG 20 000 or of PEO 50 000, but still remains within an operational temperature range for forming the fluorosulfates $(A_{1-a}A'_a)_x(Z_{1-b}Z'_b)(SO_4)_sF_f$, in particular $LiFeSO_4F$.

Example 1

Preparation of $LiFeSO_4F$ in PEG 20 000

Preparation of $FeSO_4 \cdot H_2O$

Figure 4:
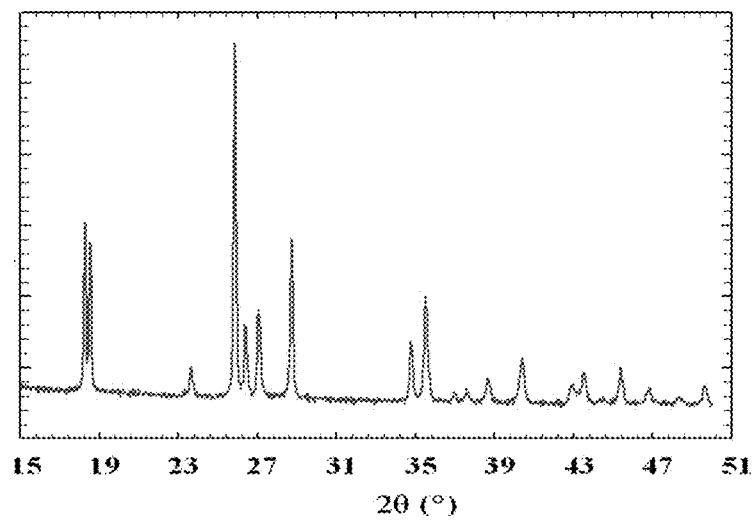
FIG. 4 is an X-ray diffraction pattern according to example 1 in accordance with one embodiment.

In a preliminary step, $FeSO_4 \cdot 7H_2O$ was submitted to thermal treatment in PEG 2000 at 150° C. for 2 hours. The monohydrate $FeSO_4 \cdot H_2O$ that formed was recovered by centrifugation, washed with ethyl acetate, and then dried under vacuum at room temperature. The compound obtained was submitted to X-ray diffraction analysis. The diffraction pattern is shown in FIG. 4. It shows the lines characteristic of the mineral szomolnokite ($FeSO_4 \cdot H_2O$).

Preparation of $LiFeSO_4F$ 0.85 g of $FeSO_4 \cdot H_2O$ and 0.1297 g of LiF (which corresponds to a 1/1 molar ratio) were mixed in a type SPEX ball grinder containing a 1-cm diameter stainless steel ball, the grinding cell was sealed under argon, and then the mixture was ground for 10 min.

An autoclave lined with Teflon® was charged with 3 g of PEG 20 000, then with the mixture of LiF and $FeSO_4.H_2O$ obtained after grinding, and it was covered with an additional 3 g of PEG 20 000. Then the autoclave was sealed under argon, it was put in an oven preheated to 150° C., and thermal treatment was carried out, comprising the following steps:
- holding at 150° C. for 40 min to melt the PEG 20 000,
- heating to 260° C. at a rate of 1° C./min
- heating to 295° C. at a rate of 0.2° C./min,
- holding at 295° C. for 24 hours, this temperature being the reaction temperature of the precursors.

After cooling the reaction mixture to room temperature, ethyl acetate was added, then the fluorosulfate obtained was separated in the form of powder by centrifugation from the solution of polymer in ethyl acetate. Then the powder obtained after centrifugation was washed 3 times with 20 mL of ethyl acetate, and then dried in a stove at 50° C. for 3 hours.

The product obtained is in the form of a sand-colored powder.

Characterization by XRD

Figure 5:
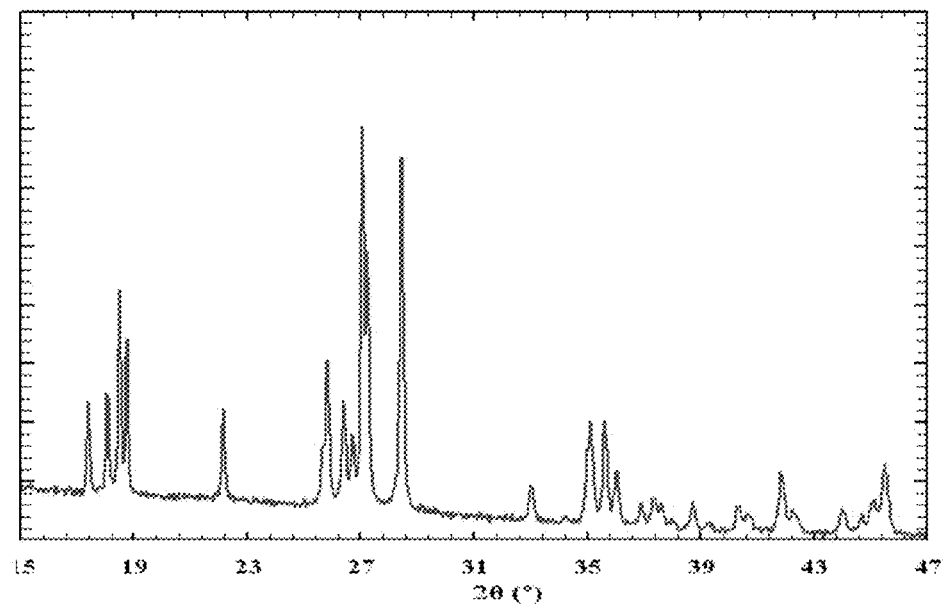
FIG. 5 is an X-ray diffraction pattern according to example 1 in accordance with one embodiment.

The product obtained was submitted to X-ray diffraction analysis. The diagram is shown in FIG. 5, and it shows that the product obtained is a single phase of $LiFeSO_4F$ with a tavorite structure P-1.

Characterization by SEM

The product obtained was characterized by SEM using an "FEI Quanta F200P" scanning electron microscope with a 20 kV electron beam under a low vacuum to avoid any effect of charging of the electrons, which could degrade the image quality. Elemental analysis was also performed on several isolated particles to verify that the product obtained has a homogeneous composition.

Figure 6:
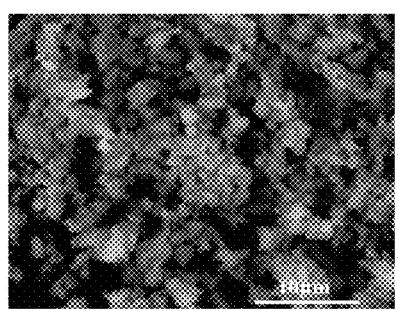
FIGS. 6a and 6b are SEM micrographs of example 1 with two different magnifications, in accordance with one embodiment.
Figure 6:
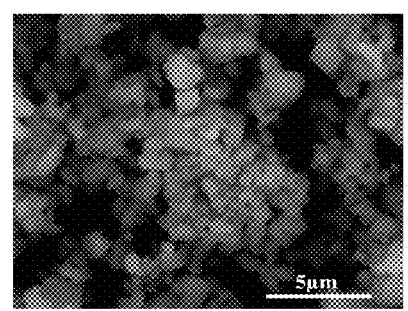

FIGS. 6a and 6b are SEM micrographs with two different magnifications, which show the morphology of the $LiFeSO_4F$ material obtained.

Elemental Analysis

Figure 7:
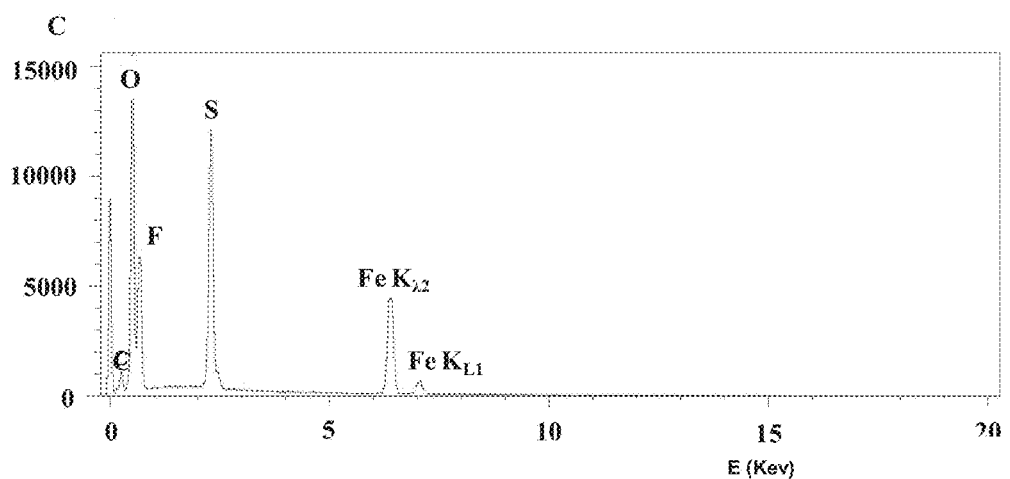
FIG. 7 is an EDX elemental analysis of example 1 in accordance with one embodiment.

EDX elemental analysis was carried out on various particles. The result obtained is shown in FIG. 7, in which the number of pulses C is shown on the ordinate and the energy E (in keV) is shown on the abscissa.

The EDX diagram does not show the presence of lithium, which is an element that is too light to be detected by the technique used.

Electrochemical Characterization

The product obtained was tested in an electrochemical cell assembled as follows.

A mixture of $LiFeSO_4F$ obtained according to the above method and Super P carbon black was prepared in a weight ratio of 80/20, and this was ground for 5 minutes under argon in a Spex-800 grinding mill containing a 10 mm diameter ball.

Two cells of the conventional Swagelok® type were constructed, using, for each cell, a lithium film as anode, two disks of Whatman GF/D borosilicate glass fiber impregnated with a solution 1 of $LiPF_6$ in an ethyl carbonate/dimethyl carbonate mixture in 1/1 weight ratio (EC), and a cathode consisting of a film of $LiFeSO_4F$ on an aluminum plunger as current collector, the amount of $LiFeSO_4F$ being 8 mg·cm$^2$.

The cells were submitted to a succession of cycles of charging and discharging in to galvanostatic mode using a MacPile controller (Claix, France) at 20° C. Cycling was performed conventionally between 2.5 and 4.2 V vs. Li$^+$/Li with a rate of C/15 for one of the cells and of C/10 for the other cell (corresponding to 1 Li$^+$ exchanged respectively in 15 h and in 10 h).

Figure 8:
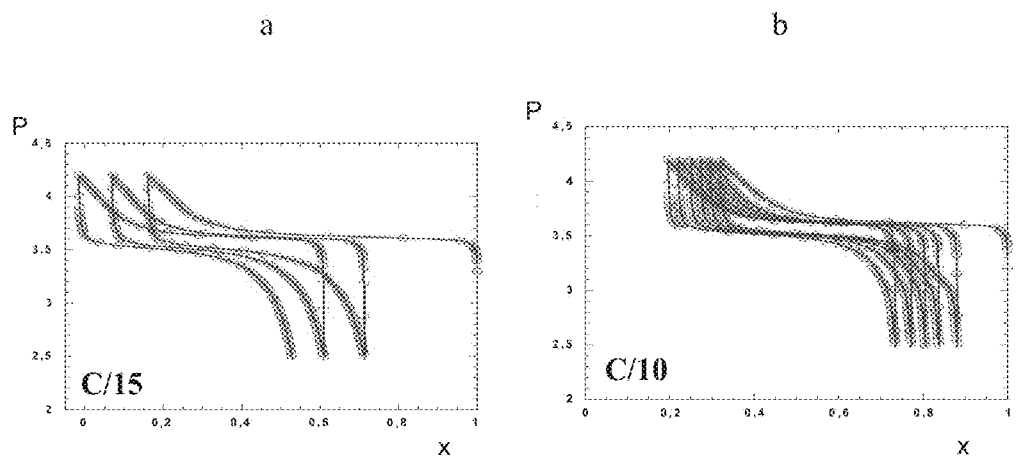
FIGS. 8a and 8b are performance graphs of example 1 in accordance with one embodiment.

The performance is shown in FIGS. 8a and 8b, in which the potential P (in V vs. Li$^+$/Li) is given on the ordinate, and the proportion x of lithium in $Li_xFeSO_4F$ is given on the ordinate. These figures confirm that the phase $LiFeSO_4F$ is electrochemically active with respect to Li. Depending on the cycling rate C/15 (extraction of a Li$^+$ in 15 hours) or C/10 (extraction of a Li$^+$ in 10 hours), more than 0.8 Li can be extracted per formula unit, which gives a reversible capacity of 130 mAh/g. These curves also show that insertion of Li is reversible over a large number of cycles. It will be noted that polarization of the electrodes is low, although the formulation of the electrodes had not been optimized, and the particles of $LiFeSO_4F$ were neither of nanometric size, nor coated with carbon. The compound $LiFeSO_4F$ is, accordingly, particularly advantageous relative to $LiFePO_4$ which, in the form of micrometric particles not coated with carbon, does not allow capacities greater than 90 mAh/g to be obtained with cycling conditions identical to those of the present example.

Example 2

Preparation of $LiFeSO_4F$ in PEO>5 000 000

The procedure of example 1 was repeated, but replacing PEG 20 000 with PEO>5 000 000, for which the melting point is 64.1° C. and the temperature of thermal decomposition is well above the synthesis temperatures used, and applying the following thermal treatment:
- holding for 40 min at 150° C. to melt the polymer,
- heating to 260° C. at a rate of 1° C./min,
- holding at 260° C. for 1.5 h,
- heating to 295° C. at a rate of 0.2° C./min,
- holding at 295° C. for 24 hours, this temperature being the reaction temperature of the precursors.

Figure 9:
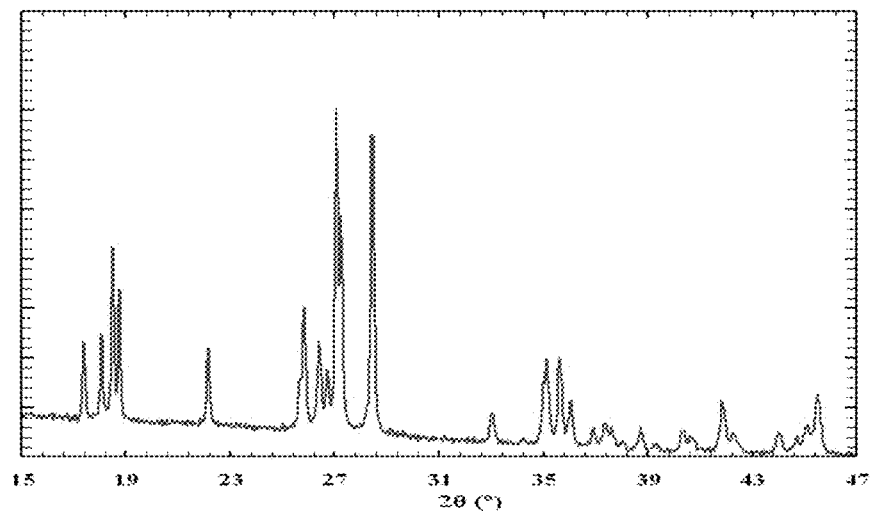
FIG. 9 is an X-ray diffraction pattern of example 2 in accordance with one embodiment.

The X-ray diffraction pattern of the product obtained is shown in FIG. 9. This shows that once again, the compound obtained is $LiFeSO_4F$ of tavorite structure with a purity of 100%.

Example 3

Preparation of $LiFeSO_4F$ in PEG Monomethyl Ether 1000

The procedure of example 1 was repeated, but replacing PEG 20 000 with a PEG monomethyl ether of molecular weight 1000 a.u.

Figure 10:
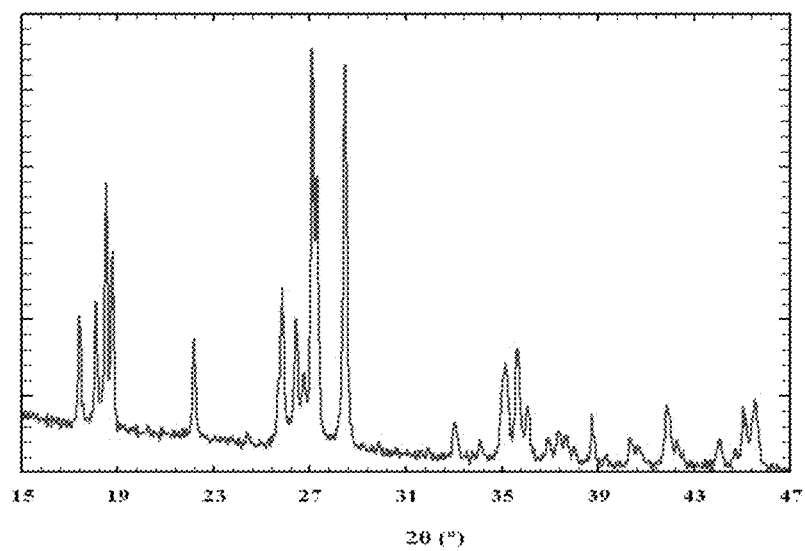
FIG. 10 is an X-ray diffraction pattern of example 3 in accordance with one embodiment.

The X-ray diffraction pattern of the product obtained is shown in FIG. 10. It shows that this product is a single phase of tavorite $LiFeSO_4F$ with a purity of 100%.

Example 4

Preparation of $LiFeSO_4F$ in PEG Monomethyl Ether 2000

Figure 11:
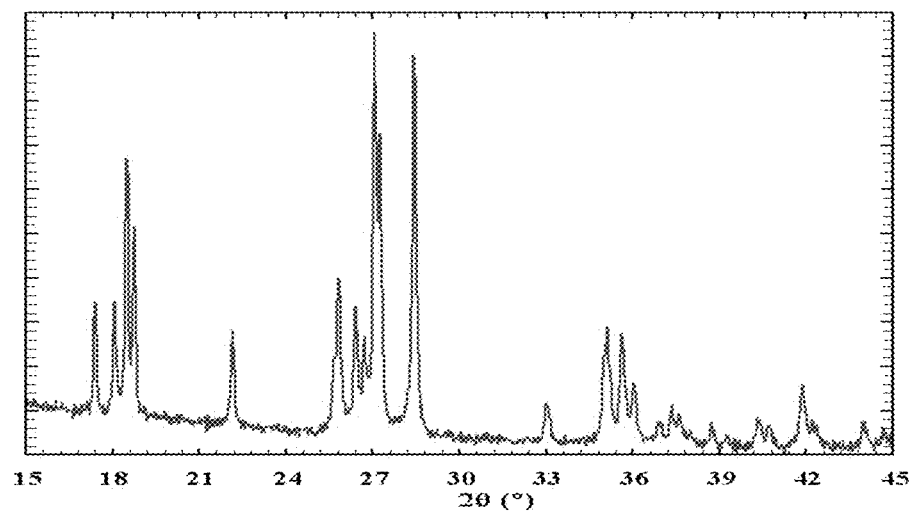
FIG. 11 is an X-ray diffraction pattern of example 4 in accordance with one embodiment.

The procedure of example 1 was repeated, replacing PEG 20 000 with a PEG monomethyl ether of molecular weight 2000 a.u., using 0.13 g of LiF and 0.8 g of $FeSO_4.H_2O$. The diffraction pattern of the product obtained in the form of powder, shown in FIG. 11, shows that it is a single phase of $LiFeSO_4F$.

Example 5

Preparation of LiFeSO$_4$F in PEG 8000

The procedure of example 1 was repeated, but using PEG 8000 instead of PEG 20 000. The product obtained only contains 80% of LiFeSO$_4$F because the polymer decomposes before the end of the reaction.

Example 6

Preparation of NaFeSO$_4$F in PEG 20 000

Figure 12:
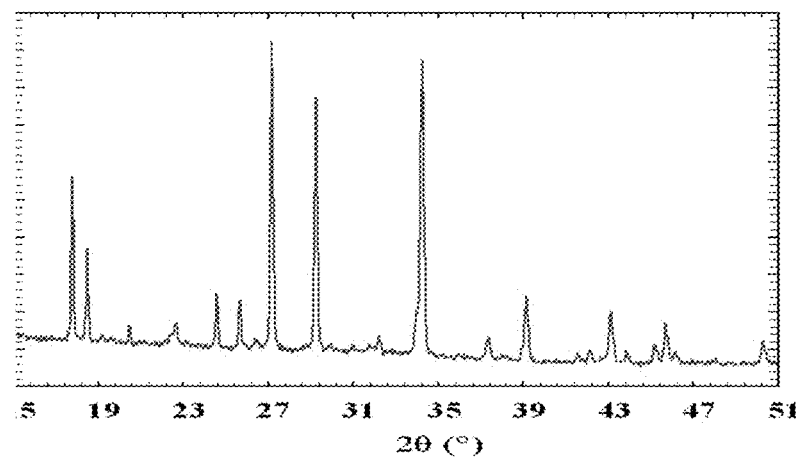
FIG. 12 is an X-ray diffraction pattern of example 6 in accordance with one embodiment.

The procedure of example 1 was repeated, but using 0.23 g of NaF instead of 0.1297 g of LiF, and holding the reaction mixture at 290° C. instead of 295° C. The diffraction pattern of the product obtained in the form of powder shows that it is a single phase of NaFeSO$_4$F. This diffraction pattern is shown in FIG. 12.

Example 7

Preparation of LiCoSO$_4$F in PEG 20 000

CoSO$_4$.H$_2$O was prepared from CoSO$_4$.7H$_2$O according to the method described in example 1 for FeSO$_4$.H$_2$O.

Figure 13:
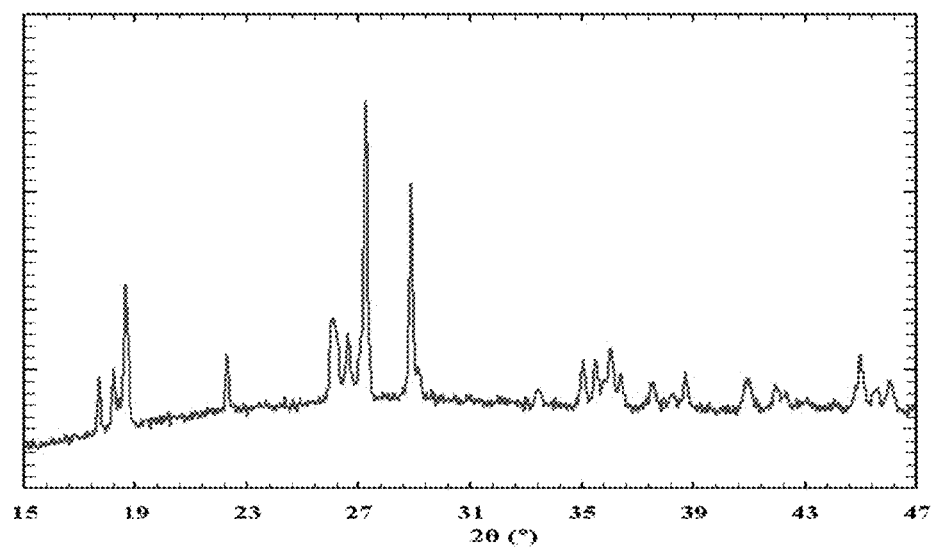
FIG. 13 is an X-ray diffraction pattern of example 7 in accordance with one embodiment.

The procedure of example 1 was repeated, but using 0.13 g of LiF instead of 0.1297 g of LiF, and 0.8 g of CoSO$_4$.H$_2$O instead of FeSO$_4$.H$_2$O, and holding the reaction mixture at 270° C. instead of 295° C. The diffraction pattern of the product obtained in the form of powder shows that it is a single phase of LiCoSO$_4$F. This diffraction pattern is shown in FIG. 13.

Example 8

Preparation of LiNiSO$_4$F

Figure 14:
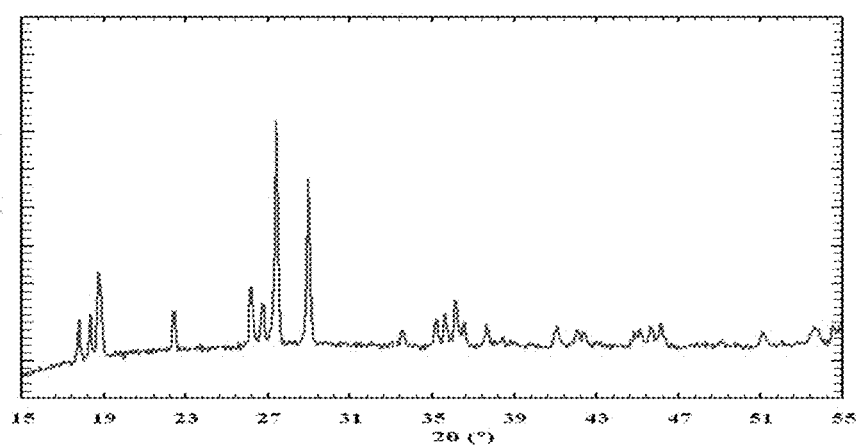
FIG. 14 is an X-ray diffraction pattern of example 8 in accordance with one embodiment.

The procedure of example 1 was repeated, but using 0.1297 g of LiF, and 0.85 g of NiSO$_4$.H$_2$O instead of FeSO$_4$.H$_2$O, and holding the reaction mixture at 270° C. instead of 295° C. The diffraction pattern of the product obtained in the form of powder shows that it is a single phase of LiNiSO$_4$F. This diffraction pattern is shown in FIG. 14.

Example 9

Preparation of LiFeSO$_4$F in a PEG-PPO-PEG Copolymer (M, 5800)

Figure 15:
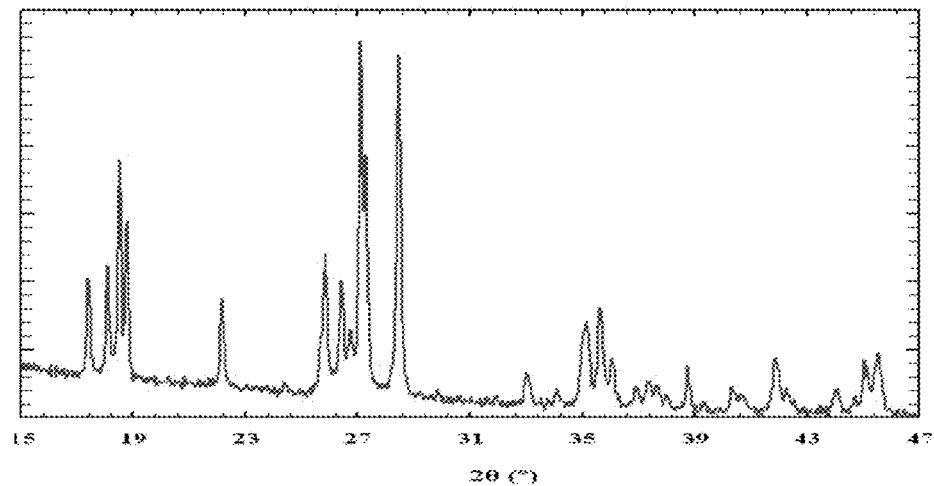
FIG. 15 is an X-ray diffraction pattern of example 9 in accordance with one embodiment.

The procedure of example 1 was repeated, using 0.13 g of LiF, 0.85 g of FeSO$_4$.H$_2$O, replacing PEG 20 000 with PEG-PPO-PEG copolymer (M$_w$ 5800) Pluronic PE10300, and holding the reaction mixture at 280° C. instead of 295° C. The diffraction pattern of the product obtained in the form of powder shows that it is a single phase of LiFeSO$_4$F. This diffraction pattern is shown in FIG. 15.

Example 10

Preparation of LiFeSO$_4$F in PMMA 38 000

0.85 g of FeSO$_4$.H$_2$O and 0.1297 g of LiF (which corresponds to a 1/1 molar ratio) were mixed in a type SPEX ball grinder containing a steel ball with a diameter of 1 cm, the grinding mill was sealed under argon, then the mixture was ground for 10 min.

An autoclave lined with Teflon® was charged with 3 g of PMMA 38 000, then the mixture of LiF and FeSO$_4$.H$_2$O obtained after grinding, and it was covered with an additional 3 g of PMMA 38 000. Then the autoclave was sealed under argon, it was put in an oven preheated to 150° C., and it was submitted to a thermal treatment comprising the following steps:
- holding at 150° C. for 1 h to melt the polymer,
- heating to 265° C. in 1.9 h,
- heating to 295° C. in 1 h,
- holding at 295° C. for 24 hours, this temperature being the reaction temperature of the precursors.

After cooling the reaction mixture to room temperature, ethyl acetate was added, then the fluorosulfate obtained in the form of powder was separated by centrifugation from the solution of polymer in ethyl acetate. Then the powder obtained after centrifugation was washed 3 times with 20 mL of dichloromethane, and was then dried in a stove at 60° C.

The fluorosulfate obtained is in the form of a dark green powder.

Figure 16:
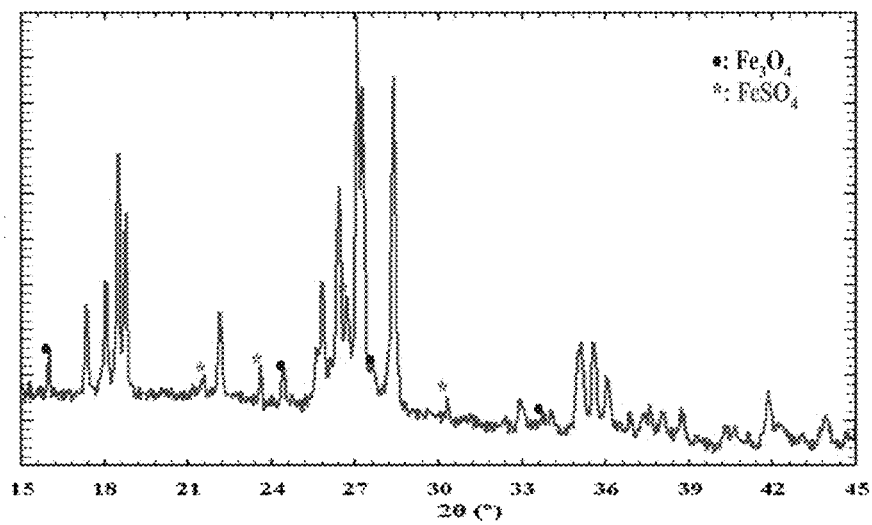
FIG. 16 is an X-ray diffraction pattern of example 10 in accordance with one embodiment.

The diffraction pattern of the product obtained is shown in FIG. 16. This shows that the product is a phase LiFeSO$_4$F of tavorite structure that is practically pure apart from some peaks of very low intensity marked with * (corresponding to the phase FeSO$_4$) and with ● (corresponding to the phase Fe$_3$O$_4$). These impurities represent quantities of about 5%.

The presence of these impurities is probably due to the fact that PMMA begins to decompose at a temperature near the synthesis temperature.

Example 11

Preparation of LiFeSO$_4$F in Polystyrene

The procedure of example 10 was repeated, replacing the polymer PMMA with a polystyrene of molecular weight 25 000.

Figure 17:
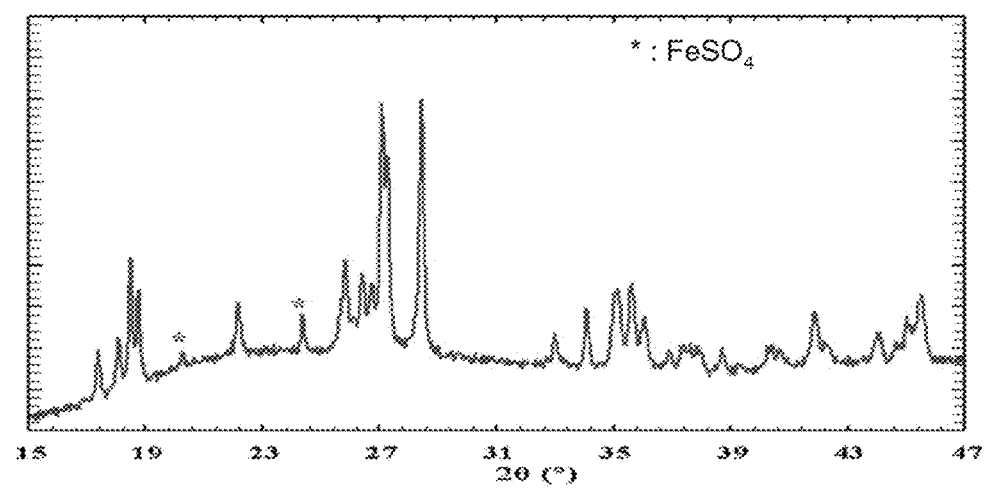
FIG. 17 is an X-ray diffraction pattern of example 11 in accordance with one embodiment.

The X-ray diffraction pattern of the product obtained is shown in FIG. 17. It shows that the phase LiFeSO$_4$F of practically pure tavorite structure is obtained. The 2 peaks of very low intensity, marked with *, correspond to the phase FeSO$_4$.

Example 12

Preparation of LiFeSO$_4$F in PEG Dimethyl Ether 2000

Figure 18:
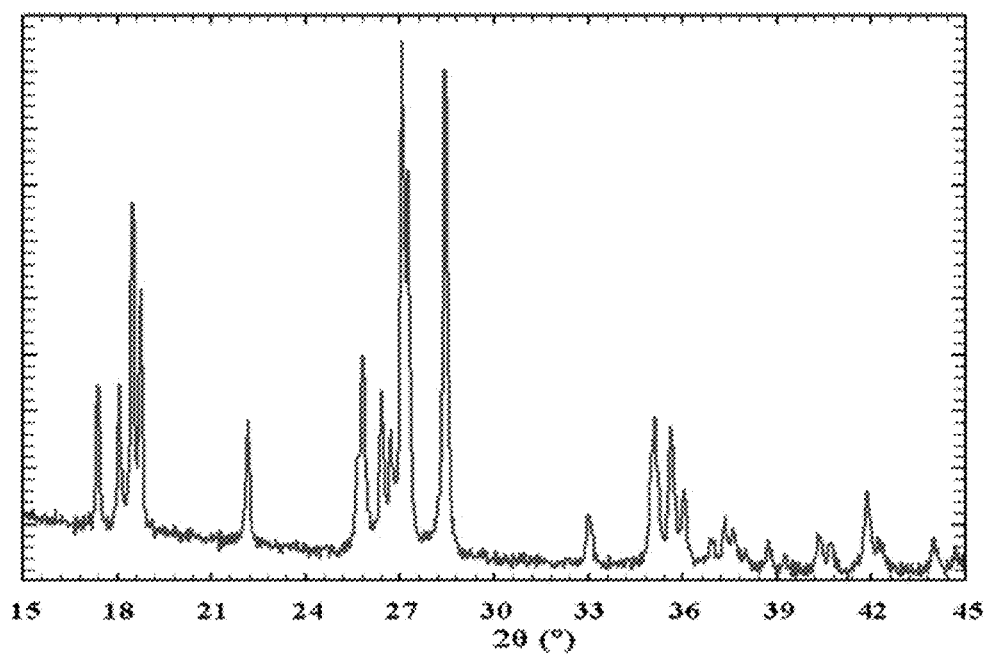
FIG. 18 is an X-ray diffraction pattern of example 12 in accordance with one embodiment.

The procedure of example 1 was repeated, replacing PEG 20 000 with a PEG dimethyl ether of molecular weight 2000 a.u., using 0.13 g of LiF and 0.85 g of FeSO$_4$.H$_2$O. The diffraction pattern of the product obtained as powder is shown in FIG. 18, and it shows that it is a single phase LiFeSO$_4$F.

Example 13

Comparative Examples

The procedure of example 10 was repeated, the substrate polymer used being a PEG 600 diacid and then a PE-block-PEG 1400 copolymer.

Preparation in the PE-Block-PEG Copolymer

Figure 19:
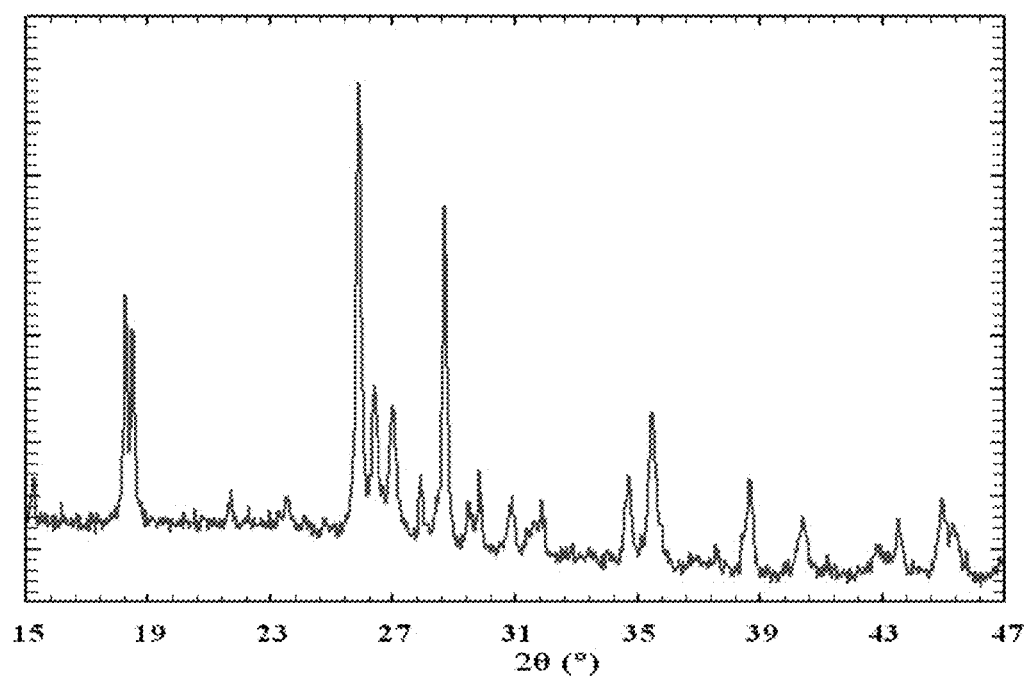
FIG. 19 is an X-ray diffraction pattern of example 13 in accordance with one embodiment.

The X-ray diffraction pattern of the product obtained in the PE-block-PEG 1400 copolymer is shown in FIG. 19. This shows coexistence of the phase FeSO$_4$.H$_2$O and of other phases such as notably FeSO$_4$.H$_2$O, Fe$_3$O$_4$, and FeF$_3$. There is no formation of the phase LiFeSO$_4$F.

Preparation in PEG 600 Diacid

The product formed contains 30% of LiFeSO$_4$F and 70% of FeSO$_4$.H$_2$O.

In both cases, the absence or the low rate of formation of the compound LiFeSO$_4$F is due to the lack of stability of the polymers used as reaction substrate.

The invention claimed is:

1. A method for preparing a material having particles of a compound that has a structure of the tavorite type and that corresponds to the formula (I): $(A_{1-a}A'_a)_x(Z_{1-b}Z'_b)_z(SO_4)_sF_f$, in which: A represents Li or Na; A' represents a vacancy or at least one doping element; Z represents at least one 3d element selected from Fe, Co, and Ni; Z' represents a vacancy or at least one doping element; the subscripts a, b, x, z, s and f are selected so as to ensure electroneutrality of the compound, and a≥0, b≥0, x≥0, z>0, s>0, f>0; and the respective amounts "a" and "b" of dopant A and Z' are such that the structure of the tavorite type is preserved, said method comprising the steps of:
 a 1st step consisting of preparing a mixture of precursors containing a hydrated sulfate of the element or elements Z, the fluoride of the element or elements A, a precursor of the element or elements Z' when b>0 and a precursor of the element or elements A' when a>0;
 a 2nd step consisting of contacting the mixture obtained in the 1st step, with a solid substrate;
 a 3rd step consisting of bringing the mixture obtained at the end of the 2nd step up to the reaction temperature of the precursors mixed during the 1st step, and maintaining said temperature until the end of the reaction;
 a 4th step consisting of removing the solid substrate;
 wherein the solid substrate is a polymer that is solid at room temperature, that has a melting point below the reaction temperature of the precursors and that is stable at least up to the reaction temperature of the precursors, said polymer being soluble in an organic solvent.

2. The method as claimed in claim 1, wherein the reaction substrate polymer is selected from the group consisting of a polyethylene glycol (PEG), a polyoxyethylene (PEO), a polystyrene (PS) or a poly(methyl methacrylate) PMMA.

3. The method as claimed in claim 1, wherein A' is a doping element selected from alkali metals different from A, alkaline-earth metals and 3d metals, and a<0.25.

4. The method as claimed in claim 1, wherein Z' is a doping element, selected from the group consisting of the alkali metals, Mn, Mg, Ca, Sc, Ti, V, Cr, Zn, Al, Ga, Sn, Zr, Nb and Ta in at least one of their oxidation states, and b<0.25.

5. The method as claimed in claim 1, wherein, in the 1st step of the method, the precursors are used in stoichiometric amount, or with an excess of alkali metal fluoride A.

6. The method as claimed in claim 1, wherein the amount of precursors in the mixture obtained at the end of the 2nd step is from 10 to 50 wt %, relative to the total weight of "precursors+polymer substrate".

7. The method as claimed in claim 1, wherein a precursor of A selected from the compounds whose anion is F$^-$, SO$_4^{2-}$ or a halide other than F is introduced into the mixture from the 1st step.

8. The method as claimed in claim 1, wherein a fluoride selected from the group consisting of ammonium, imidazolium or pyridinium fluorides is introduced into the mixture from the 1st step.

9. The method as claimed in claim 1, wherein the precursor of Z is a compound ZSO$_4$.H$_2$O in which Z is selected from the group consisting of Fe, Co, Ni or a solid solution of these compounds.

10. The method as claimed in claim 1, wherein a precursor of A' selected from the sulfates of A', and the halides of A' is introduced into the mixture from the 1st step.

11. The method as claimed in claim 1, wherein a precursor of Z' selected from the sulfates of Z' and the halides of Z' is introduced into the mixture from the 1st step.

12. The method as claimed in claim 1, wherein the mixture from the 1st step contains a precursor of the SO$_4^{2-}$ anion selected from the acid H$_2$SO$_4$, and any one of its ammonium, amine, imidazole or pyridine salts.

13. The method as claimed in claim 1, wherein the third step comprises a first phase for melting the reaction substrate polymer, at a temperature between 30 and 160° C., and a second phase for reacting the precursors of compound (I) at a temperature between 230 and 300° C.

14. The method as claimed in claim 1, wherein the 3rd step is carried out under inert atmosphere, at atmospheric pressure.

* * * * *